H. GODFREY.
ADVERTISING DEVICE.
APPLICATION FILED AUG. 13, 1917.

1,275,244.

Patented Aug. 13, 1918.
2 SHEETS—SHEET 1.

Harvey Godfrey
Inventor

By Geo. Kimmel
Attorney

H. GODFREY.
ADVERTISING DEVICE.
APPLICATION FILED AUG. 13, 1917.
1,275,244.
Patented Aug. 13, 1918.
2 SHEETS—SHEET 2.
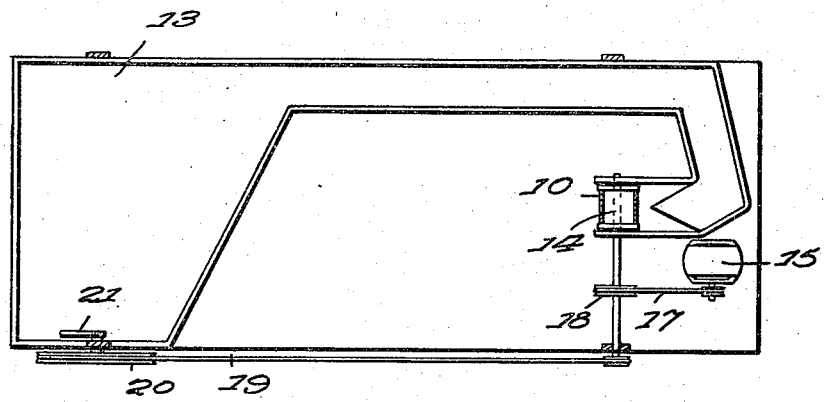
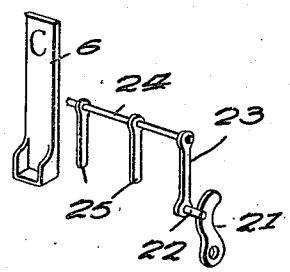
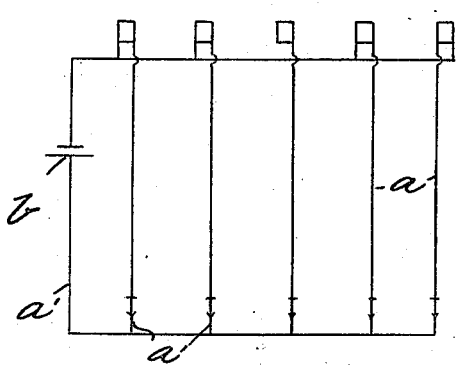
Harvey Godfrey
Inventor
By Geo. P. Kimmel
Attorney

UNITED STATES PATENT OFFICE.

HARVEY GODFREY, OF PITTSBURGH, PENNSYLVANIA.

ADVERTISING DEVICE.

1,275,244.  Specification of Letters Patent.  Patented Aug. 13, 1918.

Application filed August 13, 1917. Serial No. 185,989.

*To all whom it may concern:*

Be it known that I, HARVEY GODFREY, a citizen of the United States, and resident of Pittsburgh, in the county of Allegheny and State of Pennsylvania, have invented certain new and useful Improvements in Advertising Devices, of which the following is a specification.

This invention relates to an advertising device and more particularly to an automatic exhibiting means.

The invention has for its dominant object to provide an automatic exhibiting or advertising device adapted to novelly display advertising matter in a manner to attract attention thereto.

Another object of the invention is to provide chance controlled means for causing the moving of the advertising bearing signs into displaying positions when engaged thereby.

It is also an object of the invention to provide means for returning the chance controlled means and signs to their initiative starting positions in order that they may be again automatically operated.

The foregoing together with additional advantageous details and arrangement of parts of the preferred embodiment of my invention will be clear from the specific description hereinafter contained, when read in connection with the accompanying drawings forming part thereof, wherein said embodiment of the invention is illustrated for the purpose of facilitating a full understanding of the present improvements.

In the drawings:—

Fig. 3 is a top plan of the chance controlled returning means with the top of the device removed;

Fig. 4 is a fragmentary detail in perspective of the means for resetting the advertising bearing signs subsequent to operation thereof; and Fig. 5 is a diagrammatic view of the electrical circuits whereby the advertising bearing signs may be illuminated upon movement of the same to displaying positions.

Figure 1:
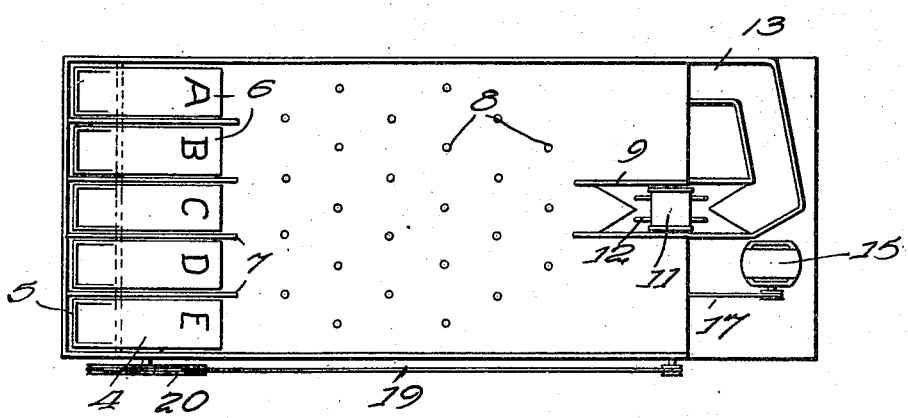
Figure 1 is a top plan of the improved advertising device.
Figure 2:
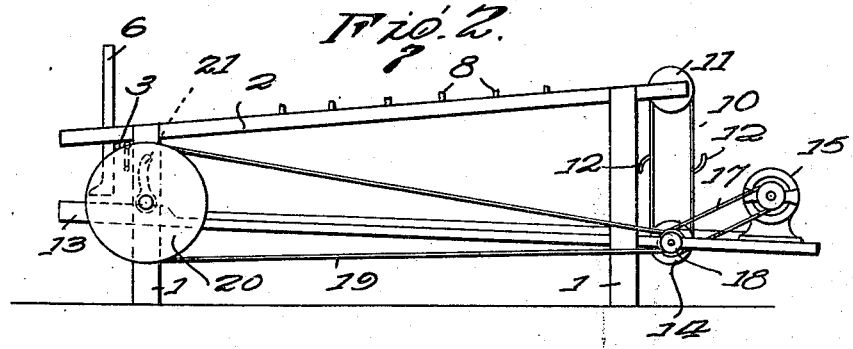
Fig. 2 is a side elevation of the same with certain of the advertising bearing signs in displaying position.

Having more particular reference to the drawings and in connection with which like reference characters will refer to corresponding parts throughout the several views, the advertising device may be stated to include a plurality of supporting legs designated by the numeral 1, which supporting legs vary in height and have arranged on their upper ends an inclined platform or way 2, the lower end of which is partly open and has pivotally supported upon a shaft 3 journaled in suitable bearings thereon a plurality of pieces generally indicated by the numeral 4, certain of the ends of which are provided with pockets 5 while the remaining ends have letters or other matter 6 contained or printed thereon and adapted to be displayed upon the moving of the said pieces into vertical positions. Guide strips 7 are arranged longitudinally of the platform 2 and between the various pivotal pieces 4, thus, affording suitable guide channels whereby chance controlled means, hereinafter described, will be directed into the pockets 5 of the said pieces 4.

Pins or like abutments 8 are arranged in staggered relation over a portion of the surface of the platform 2 while a guide way 9 is arranged upon the upper portion thereof and communicated with an endless conveyer 10 extending over a pulley 11 journaled in suitable bearings therebetween. Buckets 12 are secured to the endless conveyer 10 and obviously, serve as means for engaging and elevating the chance controlled means.

Arranged directly below the platform 2 is a return platform or way 13, the same being inclined in a pitch opposite to the arranging of the upper platform 2, thus serving as means for returning the chance controlled means which are preferably formed of spherical bodies such as marbles or the like, into engagement with the lower portion of the endless conveyer 10 which extends about a second pulley 14 journaled in bearings upon the lower end of the said platform 13.

An extension is formed upon the lower end of the platform 13 and has a motor 15 mounted thereon, which motor is connected by belt gearing 17 with the pulley 14 through the medium of a pulley 18 mounted adjacent the same and keyed to rotate therewith. A second power transmitting belt 19 extends from the pulley 18, forwardly of the device into engagement with a pulley 20 mounted upon a suitable shaft carried in bearings on one of the supporting legs 1. The shaft carrying the pulley 20 is also provided with a cam 21 rotatable therewith and adapted to be intermittently engaged with a trip 22 carried upon the lower end of an arm 23 mounted upon a shaft 24. As will be noted, the said shaft 24 is journaled in bearings arranged upon the under side of the lower end of the platform 2 and carries a plurality of other arms 25 thereon, these arms in turn being adapted to engage the pivotal pieces 4 when the same are moved to their vertical positions. Thus, the pivotal pieces will be automatically returned to their initiative starting positions or reset for further operation.

In the Fig. 5 I have shown a diagrammatic view of a system of electrical circuits which have the various conductors $a$ thereon engaged with the pivotal pieces 4 while the conductors $a'$ are engaged with suitable contact points arranged in positions adapted to be engaged by the pivotal pieces upon the swinging of the same into their vertical positions. A source of energy $b$ is included in the conductors $a$ and $a'$ and as a consequence, when the cam controlled means are engaged in the pockets 5 of the pivotal pieces 4 they will cause their respective circuits to be closed. Incandescent lamps or magnetically operated devices may be controlled by these various circuits to illuminate the letters and to operate mechanical devices connected thereto and arranged in a show window.

In operation, marbles are elevated by the endless conveyer 10 and delivered into the guide way 9 from whence they will be discharged onto the pin covered surface of the platform 2. The downward course of the marbles will be deflected due to their engagement with the said pins 8 and as a consequence, movement of the same into engagement with the various pivotal pieces 4 will be controlled by chance. After rolling down the incline, the marbles pass into certain of the several channels and into the pockets 5 of the particular pieces 4 arranged therein. The weight of the marbles will cause the fingers to move to vertical positions, thus, bringing the advertising bearing portions thereof into positions whereat they will be displayed. It can be so arranged, that when all fingers have assumed upright or vertical positions, a word or name will be spelled thereby. Upon movement of the pivotal pieces to their vertical positions, the marbles will be discharged from the pockets thereof into the inclined lower platform 13 and from there delivered into the buckets 12 of the endless conveyer 10 whereupon they will be again elevated and discharged into the guide way 9. Simultaneous with the travel of the endless conveyer 10, the shaft carrying the cam 21 will be also rotated, thereby causing the said cam to be intermittently engaged with the trip 22, thus rocking the shaft 24 and the arms 25, which arms will in turn move the pivotal pieces 4 back into their initiative starting positions, that is, reset the same for further operation. In this way, it will be readily understood that the entire advertising operation is accomplished automatically.

Manifestly, the construction shown is capable of considerable modification and such modification as is within the scope of my claims, I consider within the spirit of my invention.

I claim:

1. A device of the character described including an inclined platform, a plurality of pieces pivoted on the lower end thereof, means movable down said platform and engageable with the pieces for moving the same into vertical positions, and other means communicating with the lower end of said platform for returning the movable means to their initiative starting positions.

2. A device of the character described including an inclined platform having a portion of the surface thereof provided with staggeredly arranged abutments, a plurality of pieces pivoted on the lower end of said platform, means movable down said platform and by said abutments and engageable with the pieces for moving the same into vertical positions, and a second platform arranged below said first platform and inclined to cause the returning of the movable means to their initiative starting positions.

3. A device of the character described including an inclined platform having a portion of the surface thereof provided with staggeredly arranged abutments, a plurality of pieces pivoted on the lower end of said platform, means movable over the platform and by the abutments and engageable with the pieces for moving the same into vertical positions, a second platform arranged below said first platform and inclined to cause the return of the movable means, and an endless conveyer arranged adjacent the ends of said first and second platforms for returning the movable means to their initiative starting positions.

4. A device of the character described including an inclined platform having a plurality of staggeredly arranged pins covering a portion of its surface, a plurality of pieces pivoted on the lower end of the platform, means movable over the surface of said platform and by the pins and engageable with the pieces for moving the same into vertical positions, return means arranged below said platform, an endless conveyer communicating with the return means and platform for elevating the movable means to their initiative starting positions, and means engageable with said pivotal pieces for automatically resetting the same.

In testimony whereof, I affix my signature hereto.

HARVEY GODFREY.

Copies of this patent may be obtained for five cents each, by addressing the "Commissioner of Patents, Washington, D. C."